(12) United States Patent
Postma et al.

(10) Patent No.: US 6,210,067 B1
(45) Date of Patent: Apr. 3, 2001

(54) CLIP FLEXURE SLIDER WASHER BEARING

(75) Inventors: Robert W. Postma, Los Angeles; Robert B. Pan, Torrance, both of CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 09/212,497

(22) Filed: Dec. 14, 1998

(51) Int. Cl.[7] .................................. F16B 43/00
(52) U.S. Cl. .................... 403/30; 411/531; 411/534
(58) Field of Search ............................ 411/531, 534, 411/535, 536, 539, 545, 546, 547, 149, 150, 154, 160, DIG. 2; 403/28, 29, 30

(56) References Cited

U.S. PATENT DOCUMENTS

| | | | |
|---|---|---|---|
| 329,615 | * | 11/1885 | Andrews ........................... 411/150 |
| 1,570,735 | * | 1/1926 | Flagstal ............................. 411/547 |
| 2,952,344 | * | 9/1960 | Pope . | |
| 4,214,444 | * | 7/1980 | Fujioka .............................. 411/531 |
| 4,437,784 | * | 3/1984 | Peterson ............................ 411/547 |
| 4,948,317 | * | 8/1990 | Marinaro ........................... 411/547 |
| 5,439,306 | * | 8/1995 | Lhernould . | |

FOREIGN PATENT DOCUMENTS

690178 * 4/1953 (GB) ..................................... 411/531

* cited by examiner

*Primary Examiner*—Flemming Saether
(74) *Attorney, Agent, or Firm*—Derrick Michael Reid

(57) ABSTRACT

A clip flexure slider washer bearing in a bolted interface assembly allows differential thermal expansion and contraction between a component mounting plate or flange fastened to a base plate by a bolt. The bearing functions as a thin lubricated spacer between the component plate and the base plate, allowing the bolted assembly to be tightened to a high preload while enabling relative sliding motion without inducing large strains and stresses in the plates or the bolt. The slider washer portions of the bearing are sandwiched between the two horizontal parallel portions of the metal clip flexure. A side portion of the clip flexure bent as a right angle to the horizontal portions and extending vertically from one edge constrains the relative sliding motion of the component and base plate to unidirectional alternating back and forth translation, thus preventing lateral motion. The full strength of the bolt remains available to support the component plate without inducing excessive friction shear forces, thus enabling differential sliding motion during thermal cycles where the component expands and contracts relative to the base plate.

1 Claim, 2 Drawing Sheets

CLIP FLEXURE WASHER BEARING

CLIP FLEXURE WASHER BEARING

CLIP FLEXURE WASHER BEARING

CLIP FLEXURE WASHER BEARING

CLIP FLEXURE WASHER BEARING ASSEMBLY

CLIP FLEXURE SLIDER WASHER BEARING

STATEMENT OF GOVERNMENT INTEREST

The invention was made with Government support under contract F04701-93-C-0094 by the Department of the Air Force. The Government has certain rights in the invention.

REFERENCE TO RELATED APPLICATION

The present application is related to assignee's copending applications entitled "Roller Washer Bearing and Method" Ser. No. 09/119,511 filed Jul. 20, 1998, "Flexure Washer Bearing and Method" Ser. No. 09/119,510, Filed: Jul. 20, 1998.

The present application is related to applicant's copending application entitled "Corrugated Slider Washer Bearing" Ser. No. 09/212,496 filed Dec. 14, 1998.

FIELD OF THE INVENTION

The invention relates to the field of mechanical washers and bearings and mechanical assemblies subjected to thermal expansion stresses and differential motion during temperature variations.

BACKGROUND OF THE INVENTION

Changes in temperature can cause excessive thermal stresses at the attachment points between arbitrary parallel plates of a mechanical assembly, such as a top component plate and a bottom base, both rigidly fastened together. An example of such a mechanical assembly is a high precision optical instrument assembly or inertial guidance unit on a spacecraft. The unit has an aluminum housing bolted to a graphite-epoxy honeycomb support base structure. The instrument and/or the support base are subjected to large changes in orbital temperature with resulting differential expansions between the base structure and the instrument. The top component plate and the bottom base plate could be fastened together using conventional fastening bolts, nuts and washers, through aligned holes extending through the component and base plate. The top component plate and the bottom base plate may have substantially different coefficients of thermal expansion. The resulting unequal amounts of expansion or contraction, if constrained, can cause significant locally induced strains and stresses. During temperature variations, the top component plate may expand and contract at a different rate than the bottom base plate, thereby tending to misalign the base holes and placing stresses upon the bolts extending through the fastening holes, leading to stress and even eventual failure of the bolt. The differential in the thermal expansion can also lead to damage to the component plate and base plate, or may result in misalignment of precision mounted instruments. These and other disadvantages are eliminated or reduced using the invention.

SUMMARY OF THE INVENTION

An object of the invention is to provide a linear slider washer bearing that reduces stresses in an assembly having fastening bolts extending between a component plate and a base plate, both expanding and contracting at differing rates during temperature variations.

Another object of the invention is to provide a method of rigidly fastening the component and base plates together using a linear flexure washer bearing, thus enabling the component and base plates to expand and contract at differing rates during temperature variations without inducing excessive stresses in the component or base plate.

The present invention is directed to a clip flexure slider washer bearing disposed between the top component plate and the bottom base plate. The clip washer bearing has a top slider washer plate and a bottom slider washer plate respectively, with the top slider washer plate being rigidly fastened to the top component plate and with the bottom slider washer plate being rigidly fastened to the bottom base plate, again with an alignment hole larger than the diameter of the bolt stem. The clip flexure is fashioned of a bent clip to enable flexure or bending, allowing unidirectional bending along the direction of expansion and contraction, but not along another direction. As the top component plate expands or contracts, the clip flexure bends as the hole in the top component plate moves in misalignment relative to the hole in the bottom base plate. At all times, the bolt remains in a rigid position affixed to the bottom base plate. The hole in the component plate being larger than the bolt stem creates sufficient space for the relative motion of the bolt stem within the alignment hole without inducing stresses in the fastening bolt.

The invention releases interface stresses by allowing relative differential motion between the component plate and base plate fastened by a bolt. The full strength of the bolt is available to support the component plate. The strength of the bolted assembly is not compromised in the presence of relative thermal expansion and contraction. The sliding of the washer bearing avoids excessive friction shear forces. The washer bearings function as thin spacers between the component and base plates, thus enabling high preload tightening of the bolted assembly. These and other advantages will become more apparent from the following detailed description of the preferred embodiment.

DETAILED DESCRIPTION OF THE PREFERRED EMBODIMENT

Figure 1A:
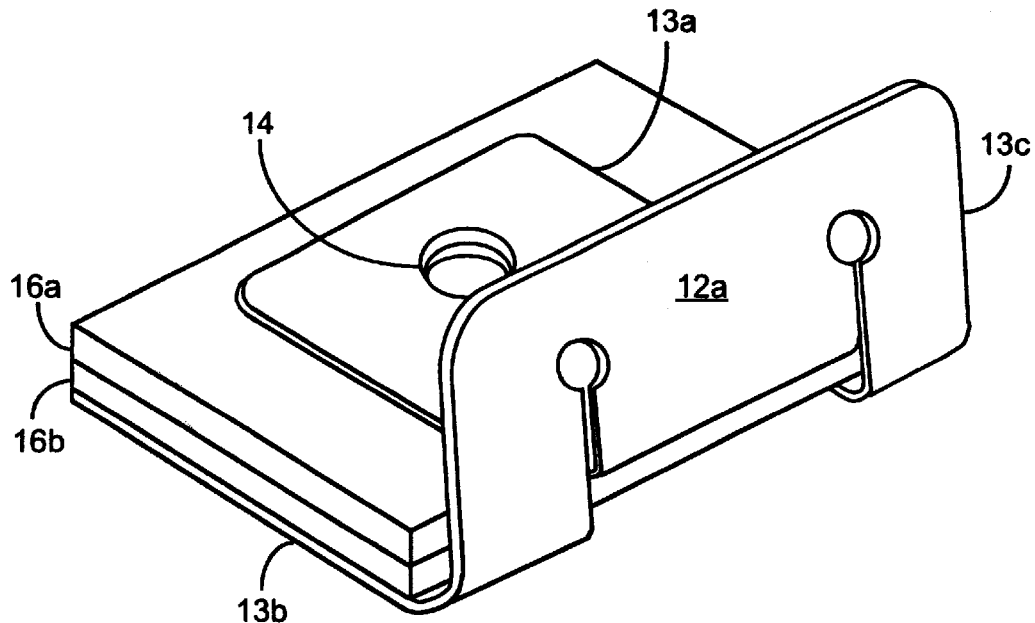
FIGS. 1a and 1b are drawings of a clip flexure slider washer bearing.
Figure 1B:
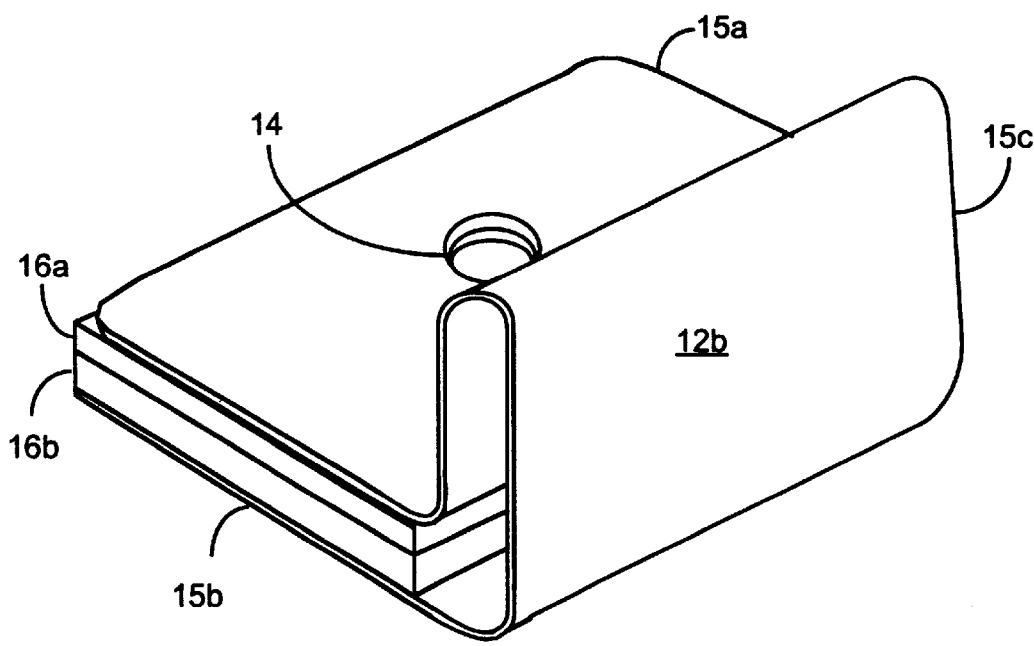

An embodiment of the invention is described with reference to the figures using reference designations as shown in the figures. Referring to FIGS. 1a and 1b, and more particularly to FIG. 1a, a clip flexure slider washer bearing 12a is shown having a bottom clip portion 13b, a side clip portion 13c and a top clip portion 13a. A slider washer bearing is shown having a top plate 16a and bottom plate 16b disposed between the top and bottom clip portions 13a and 13b. The plates 16a and 16b may be flat or roller washer bearings. The top slider plate 16a has a top surface abutting the top clip portion 13c and the bottom slider plate 16b has a bottom surface abutting the bottom clip portion. The top and bottom flexure clip portions 13a and 13b have the mounting hole 14 extending in alignment through the slider plates 16a and 16b. The side clip portion 13c bends relative to the horizontal position of the clip portions 13a and 13b and of the slider plates 16a and 16b. As the vertical side clip portion 13c bends and tilts from its vertical position, the top clip portion 13a and top slider plate 16a move in the horizontal plane relative to the bottom clip portion 13b and bottom slider plate 16b, perpendicular to the vertical plane of the side clip portion 13c. The clip 12a can be made by stamping out the basic shape from a piece of sheet metal and bending the bottom clip portion 13b from the side clip portion 13c and by bending the top clip portion 13a also from the side clip portion 13c.

Referring more particularly to FIG. 1b, another clip washer bearing 12b is shown having a bottom clip portion 15b, a side clip portion 15c and a top clip portion 15a. Clip washer bearing 12b has the alignment bolt hole 14, but the side clip portion 15c is a U shaped bent piece. As above, the top and bottom clip portions 15a and 15b extend horizontally from the side portion 15c to enable flexure bending. As shown, the top and bottom clip portions 15a and 15b extend away from the side clip portion 15c along the same horizontal direction. The top and bottom clip portions 15a and 15b also have the mounting hole 14 extending in alignment through the slider plates 16a and 16b. The side clip portion 15c bends relative to the horizontal position of the clip portions 15a and 15b and of the slider plates 16a and 16b. The clip washer bearing has the top portion 15a and the bottom portion 15b extending in the same direction thereby enabling flexure along one horizontal direction but not in any other directions.

Figure 2:
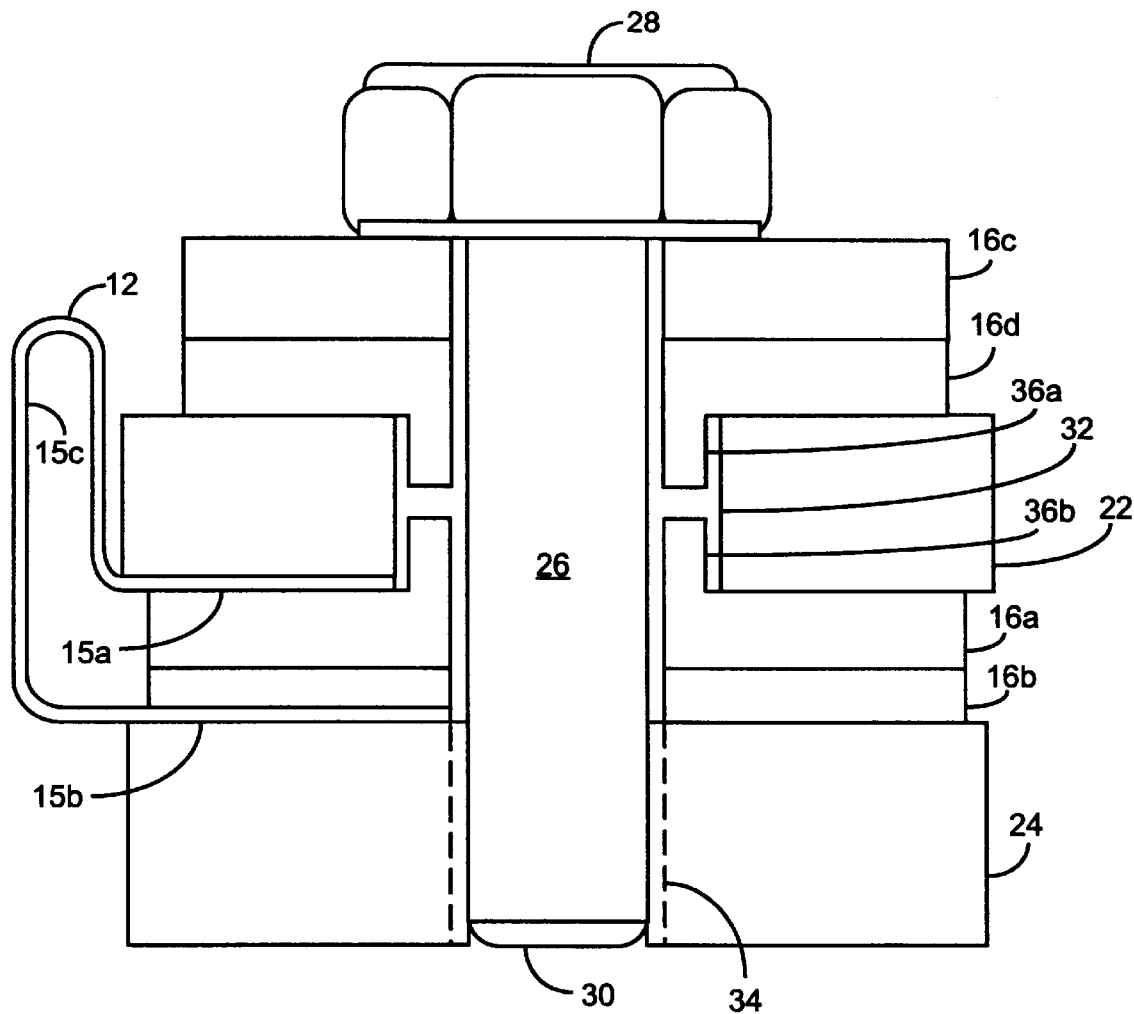
FIG. 2 is a drawing of a clip flexure slider washer bearing assembly.

Referring to FIG. 2, a clip flexure washer bearing assembly is shown having a flexure clip washer 12 containing a slider washer bearing consisting of top and bottom plates 16a and 16b, and having another slider washer bearing 16c and 16d. The clip flexure slider washer bearing assembly is used to enable relative horizontal motion between a top component plate 22 and a bottom base plate 24. The slider washer bearings 16ab and 16cd are arranged to extend along the relative thermal expansion and contraction motion of the top component plate 22 relative to the bottom base plate 24, a left to right direction relative to viewing FIG. 2. The slider washer bearings 10ab and 10cd, and the flexure clip 12 constrain all other translatory motion of the component plate 22 relative to the base plate 24. A bolt 26 comprising a threaded stem 30 and bolt head 28 extends vertically through the plates 22 and 24, through a bore hole 32 in the top component plate 22 and a threaded hole 34 in the bottom base plate 24. The holes 32 and 34 are in initial alignment when the top and bottom plates 22 and 24 are initially fastened together. The base plate 24 could be a honeycomb structure having a low coefficient of thermal expansion whereas the component plate 22 may be an aluminum plate having a high thermal coefficient. The relative movement between the plates 22 and 34 may be, for example, between 0.002 and 0.006 inches over a typical temperature range.

The slider washer bearings 16ab and 16cd may have pilot registrations 36a and 36b for centering the bearings 16ab and 16cd into the hole 32. The registrations 36a and 36b are optional circular vertically extending flanges initially centered within bolt hole 32 to align the bearings 16ab and 16cd to the bolt hole 32. As shown, the hole 32 is larger than the diameter of the registrations 36a and 36b, and much larger than the diameter of the bolt stem 30, so that the top component plate 22 can move horizontally relative to the bottom base plate 24 while the bolt 36 remains in a vertical position while rigidly affixed to, preferably screwed into, the bottom base plate 24.

The washer bearings 16ab, 16cd and 12 are disposed in alignment around a bolt hole 32 having a larger diameter than the fastening bolt stem 30 extending through the bolt hole 32 in the top component plate 22 and into the bottom base plate 24 into which the bolt 26 is rigidly fastened. The bolt 28 fastens together the top component plate 22, the bottom base plate 24 and the two slider washer bearings 16ab and 16cd and the flexure clip 12. The slider washer bearing 16ab and flexure clip 12 are disposed between the bottom base plate 24 and the top component plate 22, and the top slider bearing 16cd is disposed between the bolt head 28 and the top component plate 22. As the top component plate 22 expands or contracts back and forth in sliding horizontal alternating unidirectional movement relative to the bottom base plate 24 during temperature variations, the bottom washer plate 16b of the top washer 16ab remains rigidly affixed to the top of the component plate 24, and, the top slider plate 16a of the bottom washer bearing 16ab and the top clip portion 15a remain rigidly affixed to the bottom of the top component plate 22, as the bottom washer plate 16b of the bottom slider washer 16ab, the bottom clip portion 15b and the top washer plate 16a of the bottom washer bearing 16ab remain affixed to the bottom of the top component plate 22, with the clip 12 bending to enable the expansion and contraction differential motion of the top component plate 22 relative to the base plate 24 without placing excessive stresses upon the bolt 26. As the top component plate 22 moves back and forth, the clip side portion 15c flexes and bends as the hole 32 in the top component plate 22 moves in misalignment relative to the threaded hole 34 in the bottom base plate 24. At all times, the bolt 26 remains in a rigid vertical and orthogonal position relative to the horizontally extending plates 22 and 24. The hole 32 in the component plate 22 is larger than the bolt stem 30 to create sufficient circumferential space around the stem 30 for the relative movement of the top component plate 22 without the top component plate 22 inducing stresses due to contact with the fastening bolt 26.

A single flexure clip washer bearing 12 may be used without the slider washer bearings 10ab or 10cd, so as to comprise a complete flexure clip slider washer bearing, but preferably, is enhanced when using both the flexure clip capability for lateral constraint and the slider washer bearings 16ab and 16cd for smooth sliding. Preferably, at least one slider washer bearing 16cd is disposed between the top component plate 22 and bottom base plate 24 with a bolt 26 extending rigidly and vertically between the base and component plates 22 and 24.

The flexure clip 12 has horizontally extending surfaces 15a and 15b for constraining lateral movement yet enabling unidirectionally back and forth movement, for example, left to right alternating unidirectional motion in the view of FIG. 2, to resist movement in other than this left to right direction. The clip and slider washer bearings 16cd and 12 can be used together between the bolt head 28 and component plate 22, but this arrangement would be redundant, because the clip washer bearing 12 is required with a slider washer bearing between the top component plate and the bottom plate 24.

In many applications, such as with the use of large circular component and base plates, the expansion and contraction is radial relative to the centers of the circular component to a plurality of circumferentially disposed mounting bolts 26. The clip washer bearing 12 can be disposed to align sliding motion to this radial relative movement, and as such, the extending portions 15c or 13c enable radial relative movement, while resisting circumferential relative movement between the component and base plates 22 and 24. Thus, the clip 12 provides a single degree of freedom alternating unidirectional relative motion in the radial direction of the plates 22 and 24. The flexure washer bearing 12 enables movement in one direction by restraining relative motion in other translatory and rotational directions.

The clip flexure washer bearing assembly is used as a load bearing mechanism for disposition between two mounting plates having relative movement, that may be caused, for example, by thermal cycling. The slider plates minimize interface friction shear forces, and when properly lubricated enhance sliding action. The full strength of the bolt with normal preloads can be maintained to support components on the mounting plate. The extending portions 13a and 13b, and 15a and 15b, are arranged in parallel along the alternating unidirectional motion. The clip flexures 12a or 15c can come in a variety of forms, such as in varying shapes. Those skilled in the art can make enhancements, improvements and modifications to the invention. However, those enhancements, improvements and modifications may nonetheless fall within the spirit and scope of the following claims.

What is claimed is:

1. An assembly, the assembly comprising, an upper plate having a flat bottom surface with an upper aperture, a lower plate having a flat top surface with a lower aperture aligned with the upper aperture, the upper aperture alternately unidirectionally moving relative to the lower aperture, a fastening bolt extending between the upper and lower plates within the upper and lower aperture, the fastening bolt for providing a loading force between the upper plate and the lower plate, a washer bearing for supporting the loading force, the washer bearing comprising:

(a) a side portion vertically extending from the side portion between to the upper plate and lower plate, (b) a top portion horizontally extending between and in parallel to the upper plate and lower plate, the top portion having a top surface for buttressing the top component plate, (c) a bottom portion horizontally extending from the side portion between the upper plate and lower plate, the bottom portion has a bottom surface for buttressing the bottom base plate, (d) a top plate buttressing the top portion, (e) a bottom plate buttressing the bottom portion and the flat bottom surface of the lower plate, and (f) an aperture extending through the top and bottom portions and top and bottom plates in alignment with the upper and lower apertures for receiving the fastening bolt, the aperture being larger than the fastening bolt for providing space around the fastening bolt for enabling the fastening bolt to move back and forth as the top portion alternately and unidirectionally moves back and forth relative to the bottom portion as the upper aperture unidirectionally moves relative to the lower aperture.

\* \* \* \* \*